US011057341B2

(12) United States Patent
Mirza et al.

(10) Patent No.: US 11,057,341 B2
(45) Date of Patent: Jul. 6, 2021

(54) ENHANCED SIGNALING TO REDUCE NO CIRCUIT SWITCH FALLBACK

(71) Applicant: T-Mobile USA, Inc., Bellevue, WA (US)

(72) Inventors: Khurram Ahmad Mirza, Bellevue, WA (US); Shujaur Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/827,048

(22) Filed: Nov. 30, 2017

(65) Prior Publication Data

US 2019/0166086 A1    May 30, 2019

(51) Int. Cl.
*H04W 24/02* (2009.01)
*H04L 29/12* (2006.01)
*H04L 12/14* (2006.01)
*H04L 29/06* (2006.01)
(Continued)

(52) U.S. Cl.
CPC ...... *H04L 61/1529* (2013.01); *H04L 12/1407* (2013.01); *H04L 29/06217* (2013.01); *H04L 65/1016* (2013.01); *H04L 65/1073* (2013.01); *H04M 15/56* (2013.01); *H04M 15/57* (2013.01); *H04M 15/63* (2013.01); *H04M 15/66* (2013.01);
(Continued)

(58) Field of Classification Search
CPC ............. H04L 65/1016; H04L 12/1407; H04L 29/06217; H04L 61/1529; H04L 61/1588; H04L 65/1073; H04M 15/56; H04M 15/57; H04M 15/63; H04M 15/66; H04W 24/02; H04W 36/0022
See application file for complete search history.

(56) References Cited

U.S. PATENT DOCUMENTS

| | | | |
|---|---|---|---|
| 2013/0250750 A1* | 9/2013 | Nishida | H04W 76/00 370/216 |
| 2014/0023029 A1* | 1/2014 | Yokota | H04W 48/20 370/329 |
| 2014/0211619 A1 | 7/2014 | Suryavanshi et al. | |

(Continued)

OTHER PUBLICATIONS

PCT Search Report and Written Opinion for Application No. PCT/US2018/061074, dated Feb. 15, 2019, 10 pages.

(Continued)

*Primary Examiner* — Asad M Nawaz
*Assistant Examiner* — Zhaohui Yang
(74) *Attorney, Agent, or Firm* — Lee & Hayes, P.C.

(57) ABSTRACT

Systems and methods for reducing fall back from long term evolution voice calls (VoLTE) to legacy systems. The system can include one or more lookup tables including ranges of internet protocol (IP) addresses for a plurality of user equipment (UE). The lookup tables can be stored on one or more network entities, such as on a proxy call session control function (PCSCF). In the event that a policy charging rules function (PCRF) is unable to establish a Gx session with the relevant packet gateway (PGW), the PCSCF can provide the name and/or the IP address for the appropriate PGW to the PCRF. The PCRF can then send a session request AVP to the IP address to cause the PGW to initiate Gx binding. The system enables VoLTE calls to be established despite problems with the PCRF and reduces fallback to legacy systems.

17 Claims, 7 Drawing Sheets

(51) Int. Cl.
*H04M 15/00* (2006.01)
*H04W 36/00* (2009.01)
(52) U.S. Cl.
CPC ....... H04W 24/02 (2013.01); H04W 36/0022 (2013.01); *H04L 61/1588* (2013.01)

(56) References Cited

U.S. PATENT DOCUMENTS

| | | | |
|---|---|---|---|
| 2014/0348074 A1* | 11/2014 | Lu | H04W 28/16 370/329 |
| 2015/0055446 A1* | 2/2015 | Avula | H04W 56/002 370/216 |
| 2015/0304865 A1 | 10/2015 | Poscher | |
| 2016/0073299 A1* | 3/2016 | Liang | H04W 4/24 370/331 |
| 2016/0191631 A1* | 6/2016 | Haraszti | H04L 67/14 709/227 |
| 2016/0226669 A1 | 8/2016 | Livanos et al. | |
| 2017/0099672 A1 | 4/2017 | Trank et al. | |
| 2017/0339740 A1* | 11/2017 | Abichandani | H04L 41/026 |

OTHER PUBLICATIONS

"VoLTE Service Description and Implementation Guidelines Version 1.0", GSM Association Official Document N2020.02, Dec. 2014, 175 pages.

* cited by examiner

ENHANCED SIGNALING TO REDUCE NO CIRCUIT SWITCH FALLBACK

BACKGROUND

As technology has progressed in cellular communications networks, speeds and bandwidth, or throughput, have increased a switching complexity has been reduced. Many cellular networks include current technologies, such as 4G LTE, and also include older technologies, such as 2G and 3G networks. This is partially to enable support for multiple types of user equipment (UE), but also provides some redundancy. In other words, if a 4G LTE enabled UE is unable to connect to the 4G LTE network, it can "fall back" to legacy 3G or even 2G networks to connect. These networks generally provide reduced performance, but are preferable to, for example, simply dropping a call.

At some point, like all legacy technologies, however, the 2G and 3G networks will need to be retired. Having equipment in a wireless base station (WBS) (E.G., a cell tower), for multiple types of networks (e.g., 2G, 3G, and 4G LTE) increases equipment costs and maintenance. In addition, at some point, the equipment for these legacy networks will no longer be available and/or supported. Thus, an alternative to simply falling back to legacy networks when there are issues on the 4G LTE would be useful.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Examples of the present disclosure comprise systems and methods for providing alternatives to simply falling back to legacy systems when problems arise on the 4G LTE (or future 5G networks). The system can include upgraded messaging between network components to enable a voice or data connection to be established on the 4G LTE network, reducing the demand for legacy 2G and 3G networks. This can ultimately enable carriers to remove legacy network components reducing network complexity, maintenance, and costs.

For ease of explanation, the system is described below as reducing the need to "fall back" from a current technology network (e.g., 4G LTE) to legacy networks, such as 2G and 3G networks. One of skill in the art will recognize, however, that similar solutions could be used in 5G, Internet of Things (IoT), machine-to-machine (M2M), and even future technologies that have not yet been invented. Thus, the use of 2G, 3G, and 4G LTE in the discussion below is simply a reflection of current technologies and is not meant to limit the application.

Due to changes in demand, the 4G LTE network was designed primarily to handle large amounts of data. Obviously, for user equipment (UE) such as cell phones, smart phones, and smart watches, however, voice calls are still a significant component of their use. As a result, voice over long-term evolution (VoLTE)—a subset of voice over internet protocol (VoIP)—has been developed. Like VoIP, VoLTE enables the communication services (e.g., voice, fax, short messaging service (SMS), voice-messaging, etc.) over the public Internet, rather than via the public switched telephone network (PSTN).

Figure 1A:
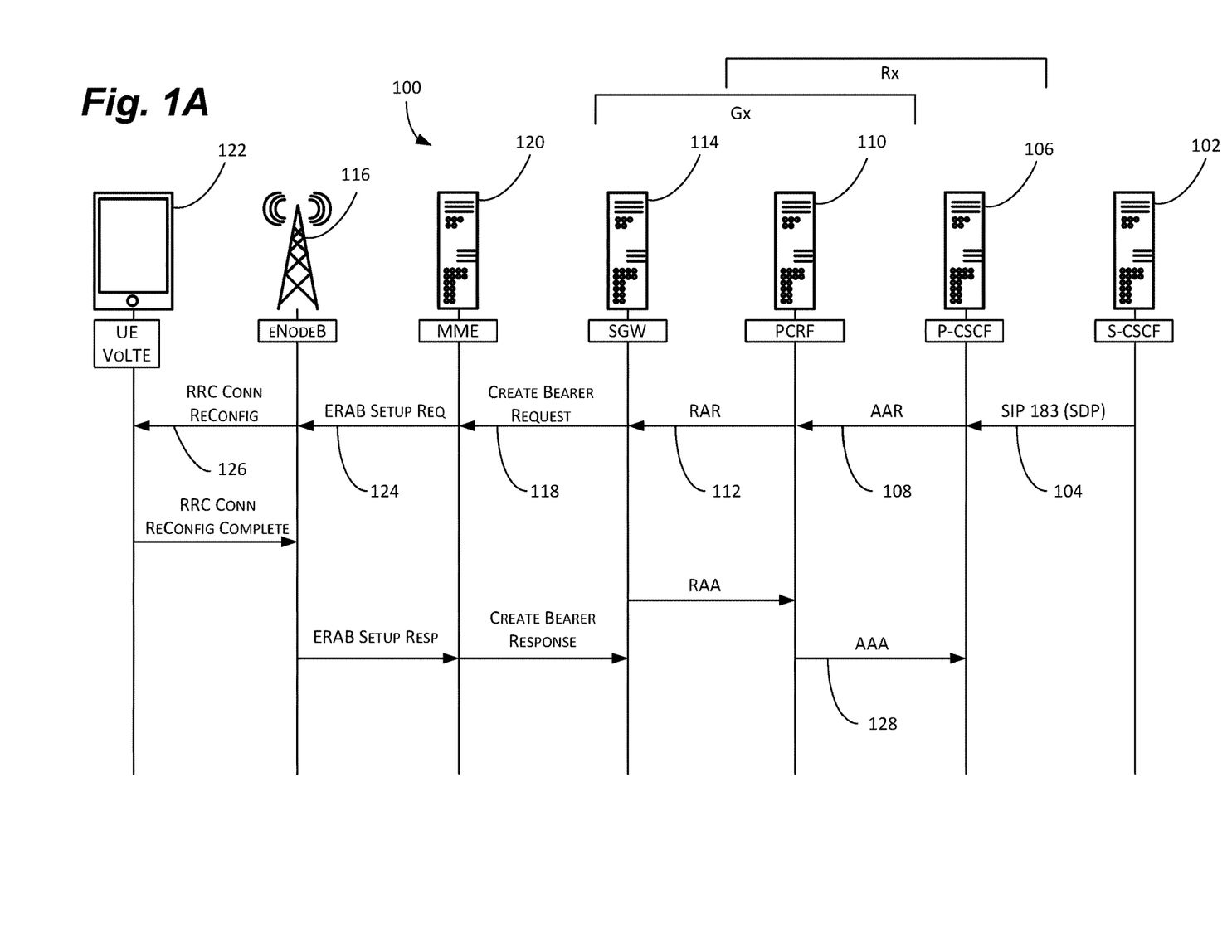
FIG. 1A depicts a signal flow for a voice over long term evolution (VoLTE) call in a normally functioning internet protocol multimedia core network subsystem (IMS).

As shown in FIG. 1A, to establish a VoLTE session, or a voice call, a series of messages are sent between network components. The process begins with a service call state control function (SCSCF) 102 sending a session initiation protocol (SIP) 104 message, generally a message 180 or 183. SIP 183, for example, is a call progress request message and generally also includes a session description protocol (SDP) message. The SDP message can include various data such as, for example, media type, format, and associated properties to enable the session to be established.

The process continues with a proxy call session control function (PCSCF) 106 sending an authorization and addressing request (AAR) 108 to a policy charging rules function (PCRF) 110. The AAR 108 can include the information from which the authorization can be performed such as, for example, the user name, called station ID, or calling station ID. This information can be provided in attribute value pairs (AVPs). The PCRF 110, in turn, can send a reauthorization request (RAR) 112 to a packet gateway (PGW) 114. The PGW 114 routes and forwards user data packets, while also acting as the mobility anchor for the user plane during inter-eNodeB handovers and as the anchor for mobility between LTE and other 3GPP technologies. The PGW 114 in turn, sends a "create bearer request" 118 to a mobile management entity (MME) 120. The MME 120 is generally responsible for initiating paging and authentication of the user equipment (UE) 122. The MME 120 can also retain location information at the tracking area level for each UE 122 and then select the appropriate PGW 114 during the initial registration process. The MME 120 also connects to the eNodeB 116 through the "S1-MME" interface and connects to PGW 114 through the "S11" interface. The MME 120 also plays a part in handover signaling between LTE and 2G/3G networks.

The MME 120 then sends an evolved packet system radio access bearer (ERAB) setup request 124 to the eNodeB 116 to which the UE 122 is connected. The ERAB setup request 124 includes the information received from PGW 114 and is forwarded to the eNodeB 116. Finally, the eNodeB 116 sends a radio resource control RRC connection request 126 to the UE 122. The messaging returns from the UE 122 through the LTE network 100, culminating an authorization, authentication, and accounting (AAA) message 128 from the PCRF 110 to the PCSCF 106.

Figure 1B:
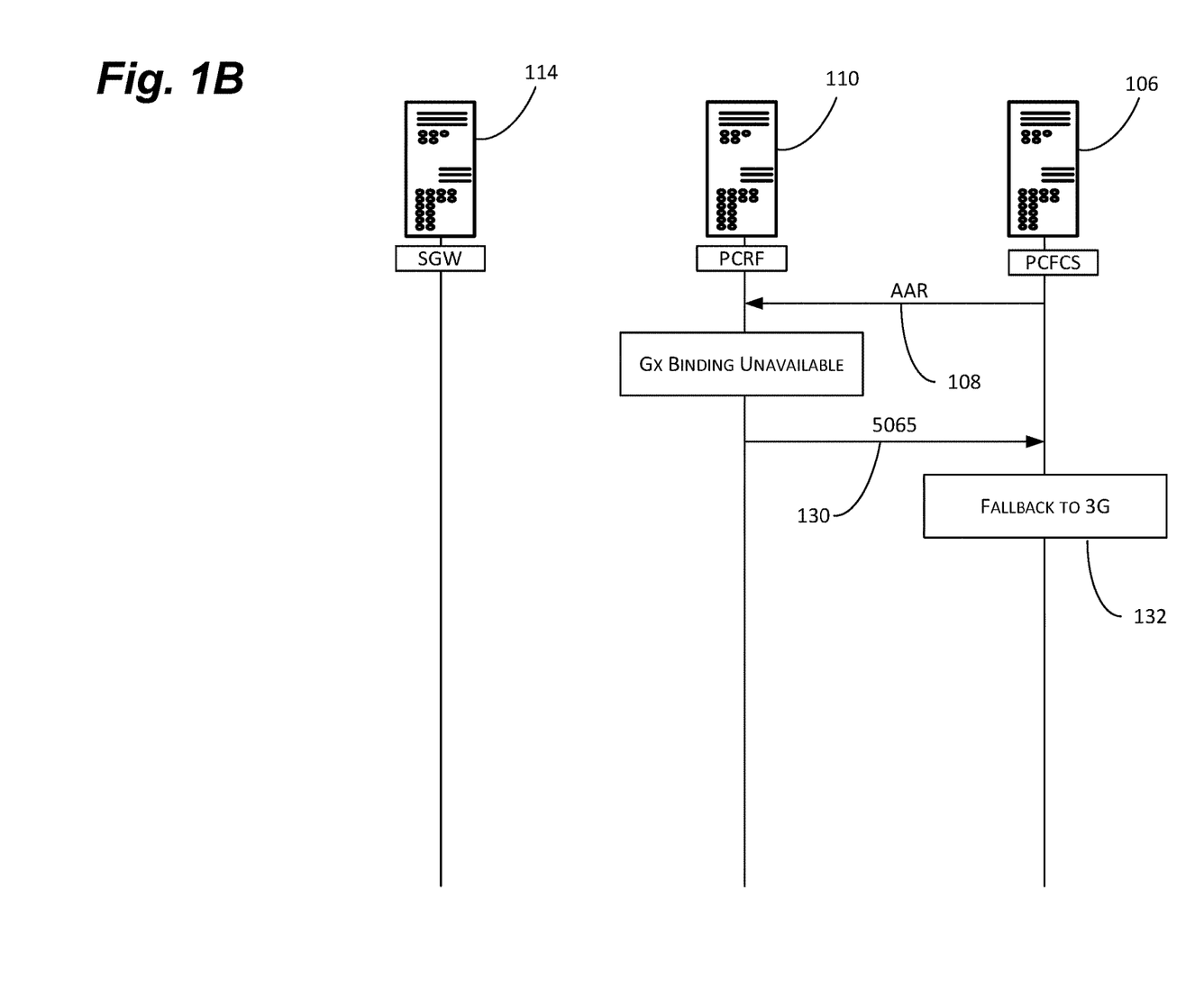
FIG. 1B depicts a signal flow for a voice over long term evolution (VoLTE) call falling back to a legacy network due to a problem with a policy control rules function (PCRF).

FIG. 1A depicts the VoLTE call setup over a normally functioning LTE network 100. As shown in FIG. 1B, however, in the current LTE Network 100, the PCSCF 106 does not have the ability to detect when a Gx session—i.e., the session between the PCRF 110 and the PGW 114—fails during the dedicated bearer setup process for a particular Rx Session—i.e., the session between the PCSCF 106 and the PCRF 110. Thus, when setup fails, the current response is simply to fall back to legacy systems.

As shown in FIG. 1B, in the case of a failure (e.g., a problem with the PCRF 110), the PCSCF 106 sends the AAR 108 to the PCRF 110, but the PCSCF 106 receives an error code from the PCRF 110. This may be a general error code 5065 ("IP-CAN_SESSION_NOT_AVAILABLE"), for example, which does not necessarily contain information regarding the nature of the error, for example, just that there is an error. The current response is simply for the PCSCF 106 to fall back to the 3G network 132, as shown. Thus, the PCSCF 106 reverts to a conventional packet-switched voice call on the 3G network, for example.

One solution to the unavailability of the Gx session on the PCRF 110 would be to enable another component, such as the PCSCF 106 or the PGW 114, for example, to initiate the Gx session. Unfortunately, there is currently no signaling in place to enable the PCSCF 106 to communicate with the PCRF 110 to establish a new Gx session with the PGW 114 (where the UE 122 session resides). Thus, any malfunctions (e.g., software or hardware problems) on the PCRF 110 currently causes VoLTE calls to fall back to packet-switched calls on the 3G network. This additional traffic places a strain on an aging infrastructure, which can cause slowdowns, dropped calls, and degradation to other network key performance indicators (KPIs).

Figure 2:
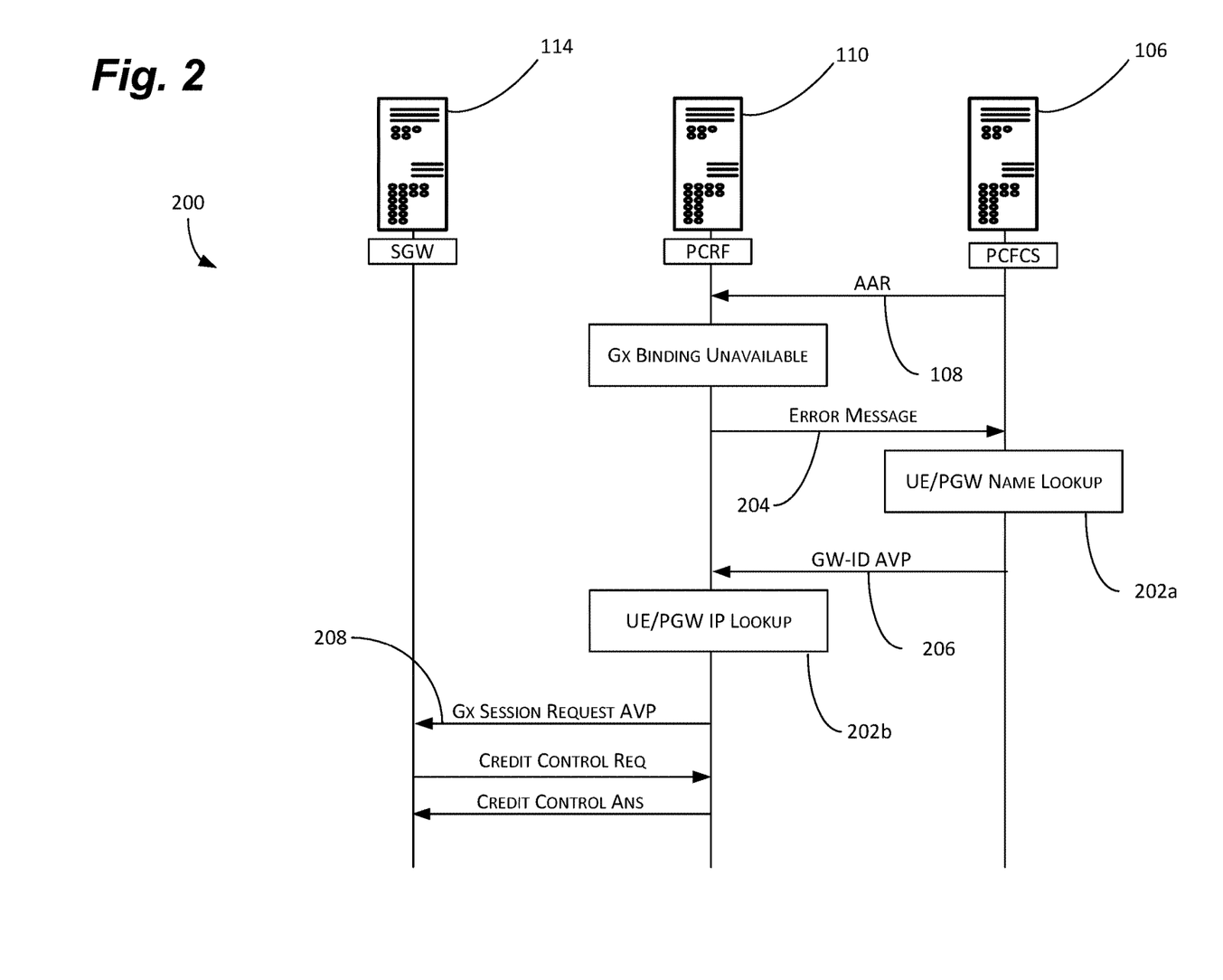
FIG. 2 depicts a signal flow for a first example of a system to reduce 3G fall back for a VoLTE call when a problem exists on the PCRF, in accordance with some examples of the present disclosure.
Figure 3:
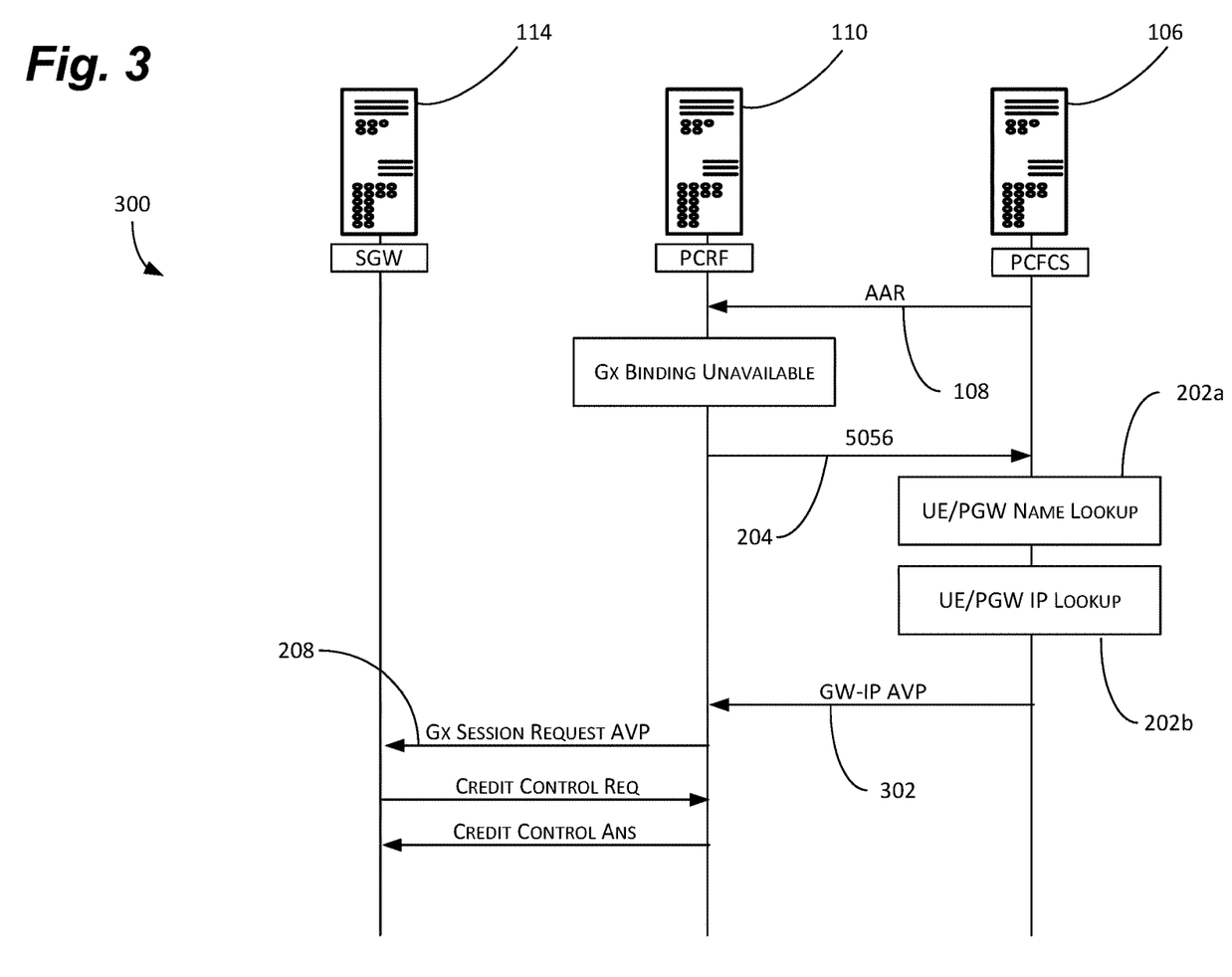
FIG. 3 depicts a signal flow for a second example of a system to reduce 3G fall back for a VoLTE call when a problem exists on the PCRF, in accordance with some examples of the present disclosure.

To this end, as shown in FIGS. 2 and 3, examples of the present disclosure relate to methods 200, 300 for establishing a new Gx session between the PGW 114 and the PCRF 110 using the PCSCF 106. In the methods 200, 300 the PCSCF 106 and/or the PCRF 110 can include one or more static lookup tables 202, which can include a database of mapping for various UE IP Pools—i.e., ranges of IP addresses for a plurality of UEs 122—to their respective PGWs 114 to enable the VoLTE session to be established instead of falling back.

As mentioned above, various hardware, software, and network issues can prevent the PCRF 110 from establishing the Gx session. A "buggy" software update, for example, could prevent the PCRF 110 from being able to interpret an AAR 108 from the PCSCF 106. The AAR 108 generally contains an authorization request, the PGW 114 for the requested UE 122 (i.e., the UE 122 to which the VoLTE call is being routed) and other information (e.g., Session-Id, NAS-Identifier, User name, etc.).

Thus, without the AAR 108, the PCRF 110 may be unable to locate the correct PGW 114 for the UE 122 and the VoLTE call fails. Conventionally, this would either cause the call to fall back to a legacy network (e.g., 2G or 3G) or to fail altogether—i.e., the call drops—if these legacy systems are unavailable. Newer cell towers, for example, may not be configured with legacy networks to reduce equipment cost and complexity as these networks are gradually phased out. As a result, if the VoLTE session cannot be established, there is no fallback position.

As shown in FIGS. 2 and 3, however, when the PCRF 110 is unable to establish the Gx session the PCRF 110 can return an error code 204 (e.g., ERROR 5065—"IP-CAN_SESSION_NOT_AVAILABLE") to the PCSCF 106. The reason for the Gx session failure is somewhat irrelevant (e.g., hardware, software, network, etc.) and can simply trigger the error code 204. The PCSCF 106 can then look up the appropriate PGW 114 for the UE 122 from a PGW name lookup 202a, or static name lookup table 102a and/or a PGW IP lookup 202b. Thus, the PCSCF 106 can provide the name of the PGW 114 (FIG. 2) or the name and/or the IP address of the PGW 114 (FIG. 3) in an AVP message 206.

As shown in FIG. 2, therefore, the PCSCF 106 can send the AAR 108 to the PCRF 110, which contains information, including the appropriate PGW 114. In this case, however, the PCRF 110, for whatever reason, is unable to open or interpret the AAR 108. As mentioned above, this may be due to a hardware failure (e.g., memory errors) or a software failure (e.g., a software update that is corrupted or contains incompatibilities). Regardless, because the PCRF 110 cannot open the AAR 108, it does not know with which PGW 114 to establish a Gx session.

Normally, this would cause the call to fail, for example, or to fall back to 3G. To prevent this, however, the PCRF 110 can instead send the error message 204 back to the PCSCF 106 indicating that the PCRF 110 is unable to establish the Gx session. In response, the PCSCF 106 can consult the PGW name lookup 202a to locate the name of the appropriate PGW 114. An example PGW name lookup 202a is shown below in Table 1:

| UE IP Range | PGW Name |
| --- | --- |
| 97.65.103.100-130 | XXPGWYY1 |
| 97.65.103.131-160 | XXPGWYY2 |
| 97.65.103.161-190 | XXPGWYY3 |
| 97.65.103.191-220 | XXPGWYY4 |

Thus, the table can include ranges of IP addresses for a plurality of UEs on the system 200 and the name of the appropriate PGW 114 for each range. Once located in the table, the PCSCF 106 can send a new message including an AVP 206 with the name (or, "GW-ID") of the appropriate PGW 114. With the GW-ID, the PCRF 110 can consult the PGW IP lookup 202b to locate the IP address for the appropriate PGW 114. Armed with this information the PCRF 110 can then send a Gx session request AVP 208 to the PGW 114 to establish a new Gx session. Thus, despite the malfunctioning PCRF 110, the Gx session is nonetheless established and the call can be completed using VoLTE rather than falling back.

Similarly, as shown in FIG. 3, both static lookup tables 202 can be located on the PCSCF 106. In this configuration, while the AVP 302 message may include the GW-ID, it can also include the IP address (GW-IP) for the appropriate PGW 114. In this manner, even more processing load is removed from the PCRF 110. In other words, the PCRF 110 does not need to consult a static lookup table 202 and is merely provided the GW-ID and GW-IP for the appropriate PGW 114. This may be useful if the PCRF 110 has a serious malfunction that prevents it from accessing the PGW IP lookup 202b independently.

In some examples, the PCSCF 106 can send the GW-ID first. If the Gx session still cannot be established, the PCSCF 106 can then send the GW-IP as a second option. Thus, depending on the level of function in the PCRF 110, the method 300 can provide an escalating solution. In still other examples, the static lookup tables 202 in PCSCF 106 can be used to directly instruct the PGW 114 to establish a new Gx Session with PCRF 110 by the PCSCF 106.

The static lookup tables 202 can be updated periodically, as necessary, such as when a new PGW 114 is added to the network. In cases, the team onboarding the new PGW 114, for example, can provide updated lookup tables 202 including any new PGWs as they come on line. The lookup tables 202 can also be updated periodically (e.g., daily, weekly, or monthly). The static lookup tables 202 can enable the PCSCF 106 to provide the correct PGW 114 to the PCRF 110 to establish the Gx session. The system 200 can also be used for additional VoLTE functions such as, for example, connecting Internet of Things components (e.g., refrigerators and thermostats), automotive reporting modules, or SIP clients in various computing devices.

Figure 4:
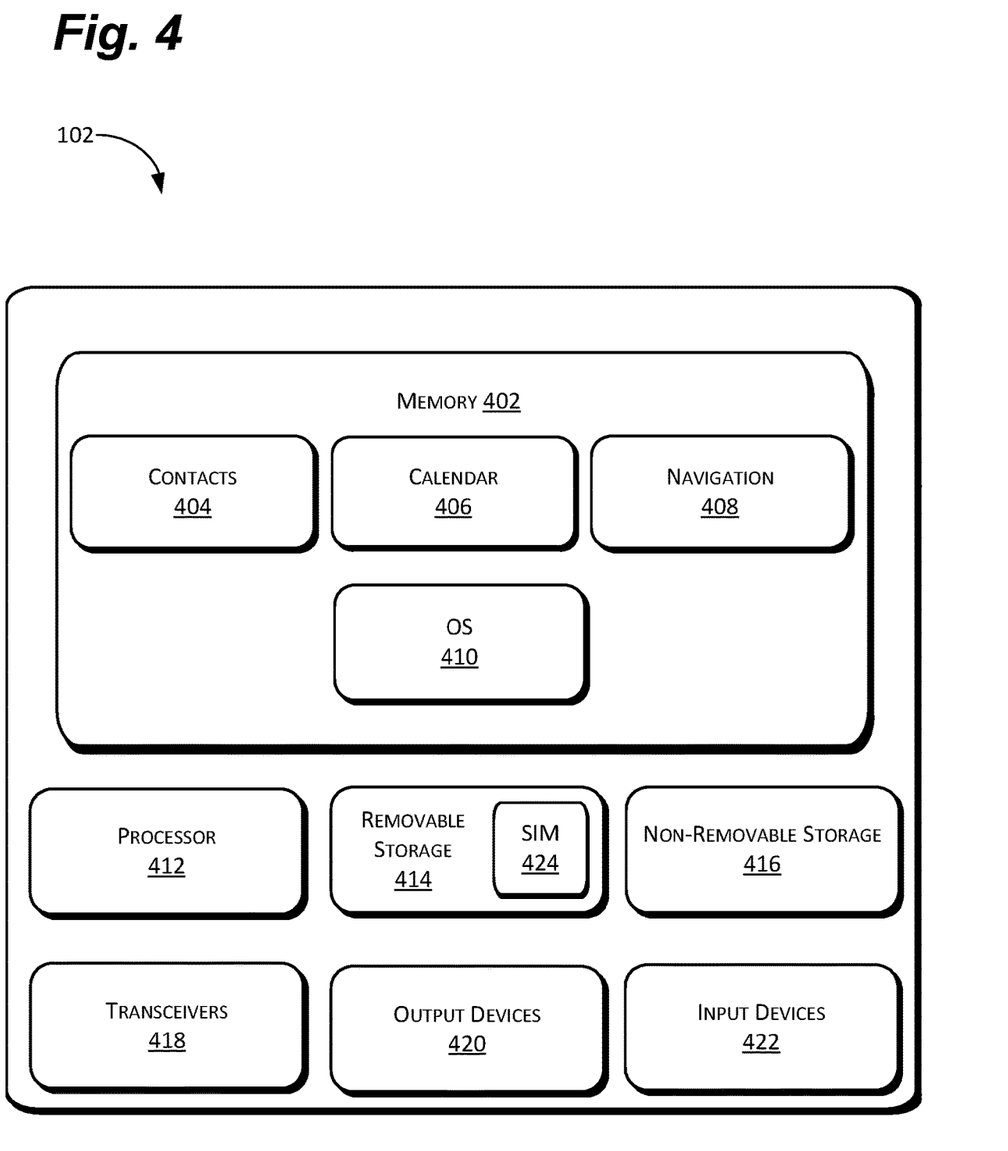
FIG. 4 is an example of a user equipment (UE) for use with the systems and methods disclosed herein, in accordance with some examples of the present disclosure.

As shown in FIG. 4, the methods 200, 300 and systems 500 can be used in conjunction with a UE 122 that can comprise a variety of electronic devices. For clarity, the UE 122 is described herein generally as a cell phone or smart phone. One of skill in the art will recognize, however, that the methods 200, 300 and systems 500 can also be used with a variety of other electronic devices, such as, for example, tablet computers, laptops, desktops, and other network (e.g., cellular or IP network) connected devices from which audio, video, and other content can be consumed. These devices are referred to collectively as UEs 122.

The UEs 122 can comprise a number of components to execute the above-mentioned functions. As discussed below, the UEs 122 can comprise memory 402 including many common features such as, for example, the contacts 404, calendar 406, navigation software 408, and the operating system (OS) 410. The UEs 122 can also comprise one or more processors 412. In some implementations, the processor(s) 412 can be a central processing unit (CPU), a graphics processing unit (GPU), or both CPU and GPU, or any other sort of processing unit. The UEs 122 can also include one or more of removable storage 414, non-removable storage 416, transceiver(s) 418, output device(s) 420, and input device(s) 422. In some examples, such as for cellular communication devices, the UEs 122 can also include a subscriber identification module (SIM) 424 including an International Mobile Subscriber Identity (IMSI), and other relevant information.

In various implementations, the memory 402 can be volatile (such as random access memory (RAM)), non-volatile (such as read only memory (ROM), flash memory, etc.), or some combination of the two. The memory 402 can include all, or part, of the functions 404, 406, 408 and the OS 410 for the UEs 122, among other things.

The memory 402 can also comprise contacts 404, which can include names, numbers, addresses, and other information about the user's business and personal acquaintances, among other things. In some examples, the memory 402 can also include a calendar 406, or other software, to enable the user to track appointments and calls, schedule meetings, and provide similar functions. In some examples, the memory 402 can also comprise navigation software 408 such as global positioning system (GPS) and/or cellular location based navigation systems. Of course, the memory 402 can also include other software such as, for example, e-mail, text messaging, social media, and utilities (e.g., calculators, clocks, compasses, etc.).

The memory 402 can also include the OS 410. Of course, the OS 410 varies depending on the manufacturer of the UE 122 and currently comprises, for example, iOS 10.3.2 for Apple products and Oreo for Android products. The OS 410 contains the modules and software that supports a computer's basic functions, such as scheduling tasks, executing applications, and controlling peripherals.

The UEs 122 may also include additional data storage devices (removable and/or non-removable) such as, for example, magnetic disks, optical disks, or tape. Such additional storage is illustrated in FIG. 4 by removable storage 414 and non-removable storage 416. The removable storage 414 and non-removable storage 416 can store some, or all, of the functions 404, 406, 408 and/or OS 410.

Non-transitory computer-readable media may include volatile and nonvolatile, removable and non-removable tangible, physical media implemented in technology for storage of information, such as computer readable instructions, data structures, program modules, or other data. The memory 402, removable storage 414, and non-removable storage 416 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UEs 122. Any such non-transitory computer-readable media may be part of the UEs 122 or may be a separate database, databank, remote server, or cloud-based server.

In some implementations, the transceiver(s) 418 include any sort of transceivers known in the art. In some examples, the transceiver(s) 418 can include wireless modem(s) to facilitate wireless connectivity with the other UEs, the Internet, and/or an intranet via a cellular connection. Further, the transceiver(s) 418 may include a radio transceiver that performs the function of transmitting and receiving radio frequency communications via an antenna (e.g., Wi-Fi or Bluetooth®). In other examples, the transceiver(s) 418 may include wired communication components, such as a wired modem or Ethernet port, for communicating with the other UEs or the provider's Internet-based network.

In some implementations, the output device(s) 420 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the UEs 122 is connected to a network, the type of call being received (e.g., video calls vs. voice calls), the number of active calls, etc. Output device(s) 420 also include ports for one or more peripheral devices, such as headphones, peripheral speakers, or a peripheral display.

In various implementations, input device(s) 422 include any sort of input devices known in the art. For example, the input device(s) 422 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 5:
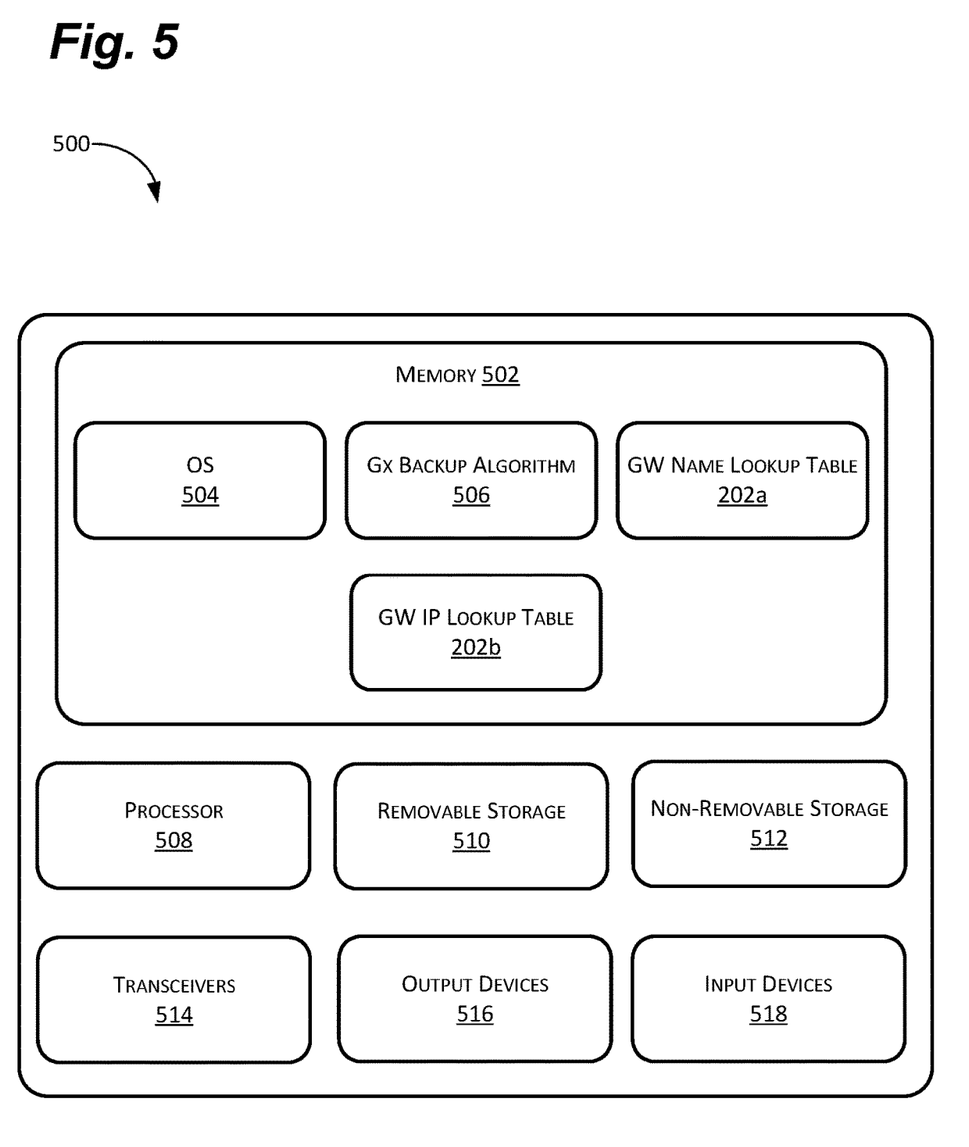
FIG. 5 is an example of a server for use with the systems and methods disclosed herein, in accordance with some examples of the present disclosure.

As shown in FIG. 5, the methods 200, 300 can also be used in conjunction with the PCSCF 106 and the PCRF 110, which can comprise a variety of electronic devices. As mentioned above, the various components of the methods 200, 300 such as, for example, the static lookup tables 202, can be included on the PCSCF 106 and/or the PCRF 110. For ease of explanation, therefore, these components 106, 110 are discussed below simply as a server 500. One of skill in the art will nonetheless recognize that the various components of the methods 200, 300 could be located in various other components of the LTE network 100 or in a dedicated server. Thus, the server 500 is intended only to simplify the discussion and not to limit the disclosure. The server 500 can comprise, for example, a network entity (e.g., the PCSCF 106 or the PCRF 110), a dedicated server, desktop, laptop, tablet, or another type of computing device.

The server 500 can comprise a number of components to execute the above-mentioned functions and apps. As discussed below, the server 500 can comprise memory 502 including many common features such as, for example, the OS 504, a Gx backup algorithm 506, and the static lookup tables 202. The server 500 can also comprise one or more processors 508. In some implementations, the processor(s) 508 can be a central processing unit (CPU), a graphics processing unit (GPU), or both CPU and GPU, or any other sort of processing unit. The server 500 can also include one or more of removable storage 510, non-removable storage 512, transceiver(s) 514, output device(s) 516, and input device(s) 518.

In various implementations, the memory 502 can be volatile (such as random access memory (RAM)), non-volatile (such as read only memory (ROM), flash memory, etc.), or some combination of the two. The memory 502 can include all, or part, of the functions 506, 202 for the server 500, among other things. The memory 502 can also include the OS 504. Of course, the OS 504 varies depending on the manufacturer of the server 500 and the type of component. Many servers, for example, run Linux or Windows Server. Dedicated cellular routing servers may run specific telecommunications OSs 504. The OS 504 contains the modules and software that supports a computer's basic functions, such as scheduling tasks, executing applications, and controlling peripherals.

In some examples, depending in the server's function, the server 500 can also comprise the Gx backup algorithm 506. The Gx backup algorithm 506 can enable the server 500 to receive error messages from various components, such as the PCRF 110, and to help establish the Gx session rather than falling back to legacy systems. In some examples, the Gx backup algorithm 506 can be substantially similar to the methods 200, 300 discussed above, but contained in a software or hardware form with the appropriate coding to cause the server 500 to perform the methods 200, 300.

The server 500 can also include the static lookup tables 202. In some examples, both of the static lookup tables 202 can be located on a single component such as, for example, the PCSCF 106. In other examples, the static lookup tables 202 can be located on more than one component such as, for example, the PCSCF 106 and the PCRF 110. As mentioned above, the PGW name lookup 202a can be located on the PCSCF 106, for example, while the PGW IP lookup 202b can be located on the PCRF 110. Regardless, the PGW name lookup 202a can include a list IP addresses, or a list of ranges of IP addresses, for a plurality of UEs 122 and the name of the PGWs 114 associated with those UEs 122. Similarly, the PGW IP lookup 202b can include a list IP addresses, or a list of ranges of IP addresses, for a plurality of UEs 122 and the IP address of the PGWs 114 associated with those UEs 122.

The server 500 may also include additional data storage devices (removable and/or non-removable) such as, for example, magnetic disks, optical disks, or tape. Such additional storage is illustrated in FIG. 5 by removable storage 510 and non-removable storage 512. The removable storage 510 and non-removable storage 512 can store some, or all, of the OS 504 and functions 506, 202.

Non-transitory computer-readable media may include volatile and nonvolatile, removable and non-removable tangible, physical media implemented in technology for storage of information, such as computer readable instructions, data structures, program modules, or other data. The memory 502, removable storage 510, and non-removable storage 512 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the server 500. Any such non-transitory computer-readable media may be part of the server 500 or may be a separate database, databank, remote server, or cloud-based server.

In some implementations, the transceiver(s) 514 include any sort of transceivers known in the art. In some examples, the transceiver(s) 514 can include wireless modem(s) to facilitate wireless connectivity with the other UEs, the Internet, and/or an intranet via a cellular connection. Further, the transceiver(s) 514 may include a radio transceiver that performs the function of transmitting and receiving radio frequency communications via an antenna (e.g., Wi-Fi or Bluetooth®). In other examples, the transceiver(s) 514 may include wired communication components, such as a wired modem or Ethernet port, for communicating with the other UEs or the provider's Internet-based network.

In some implementations, the output device(s) 516 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the server 500 is connected to a network, the type of call being received (e.g., video calls vs. voice calls), the number of active calls, etc. Output device(s) 516 also include ports for one or more peripheral devices, such as headphones, peripheral speakers, or a peripheral display.

In various implementations, input device(s) 518 include any sort of input devices known in the art. For example, the input device(s) 518 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 6:
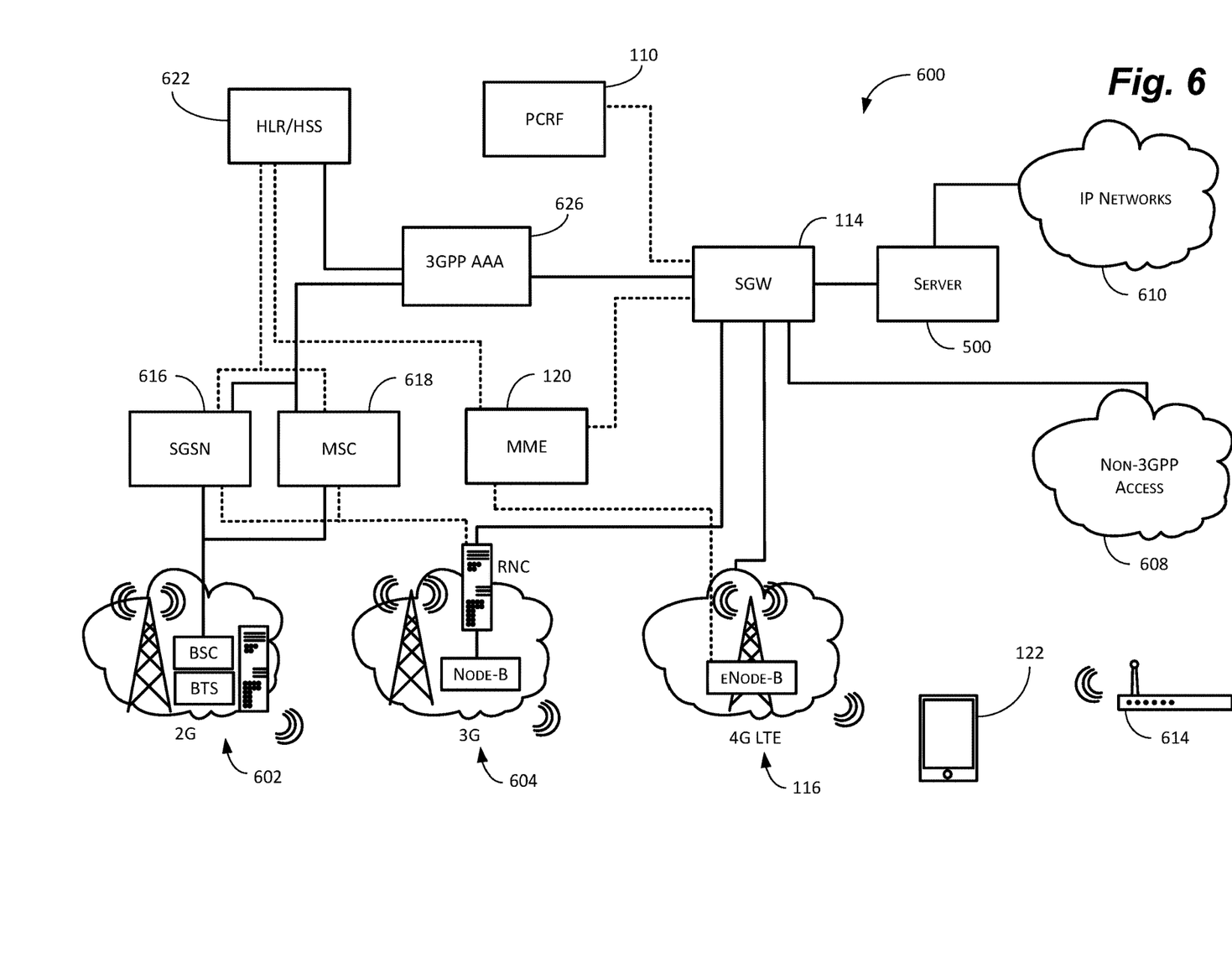
FIG. 6 is an example of a cellular and internet protocol network for use with the systems and methods disclosed herein, in accordance with some examples of the present disclosure.

FIG. 6 depicts a conventional cellular network 600 including 2G 602, 3G 604, and 4G long-term evolution (LTE) 100 components. Of course, future technologies, such as, for example, 5G, Internet of Things (IoT), and device-to-device (D2D) components could also be included and are contemplated herein. As mentioned above, many of the "back-end" components of the network 600 could handle some, or all, of the functions discussed above. Indeed, some, or all, of the aforementioned Gx backup algorithm 506, the PGW name lookup 202a, or the PGW IP lookup 202b could be located on one or more of, for example, the PCSCF 106, PCRF 110, PGW 114, or other components. In other words, the server 500 can be standalone or can be integrated into one of the existing network components.

As is known in the art, data can be routed from the Internet or other sources using a circuit switched modem connection (or non-3GPP connection) 608, which provides relatively low data rates, or via IP based packet switched 610 connections, which results is higher bandwidth. The LTE system 100, which is purely IP based, essentially "flattens" the architecture, with data going straight from the internet to the PGW 114 to evolved Node B transceivers 116, enabling higher throughput. Many UEs 122 also have wireless local area network (WLAN) 614 capabilities, in some cases enabling even higher throughput. In some cases, cellular carriers may use WLAN communications in addition to, or instead of, cellular communications to supplement bandwidth.

The serving GPRS support node (SGSN) 616 is a main component of the general packet radio service (GPRS) network, which handles all packet switched data within the network 600—e.g. the mobility management and authentication of the users. The mobile switching center (MSC) 618 essentially performs the same functions as the SGSN 616 for voice traffic. The MSC 618 is the primary service delivery node for global system for mobile communication (GSM) and code division multiple access (CDMA), responsible for routing voice calls and short messaging service (SMS) messages, as well as other services (such as conference calls, fax, and circuit switched data). The MSC 618 sets up and releases the end-to-end connection, handles mobility and hand-over requirements during the call, and takes care of charging and real time pre-paid account monitoring.

Similarly, the mobility management entity (MME) 120 is the key control-node for the 4G LTE network 100. It is responsible for idle mode UE 122 paging and tagging procedures including retransmissions. The MME 120 is involved in the bearer activation/deactivation process and is also responsible for choosing the PGW 114 for the UE 122 at the initial attach and at time of intra-LTE handover involving Core Network (CN) node relocation (i.e., switching from one cell site to the next when traveling). The MME 120 is responsible for authenticating the user (by interacting with the HSS 622 discussed below). The Non-Access Stratum (NAS) signaling terminates at the MME 120 and it is also responsible for generation and allocation of temporary identities to UE 122. The MME 120 also checks the authorization of the UE 122 to camp on the service provider's HPLMN or VPLMN and enforces UE 122 roaming restrictions on the VPLMN. The MME 120 is the termination point in the network for ciphering/integrity protection for NAS signaling and handles the security key management. The MME 120 also provides the control plane function for mobility between LTE 100 and 2G 602/3G 604 access networks with the S3 interface terminating at the MME 120 from the SGSN 616. The MME 120 also terminates the S6a interface towards the home HSS 622 for roaming UEs 122.

The HSS/HLR 622 is a central database that contains user-related and subscription-related information. The functions of the HSS/HLR 622 include functionalities such as mobility management, call and session establishment support, user authentication and access authorization. The HSS, which is used for LTE connections, is based on the previous HLR and Authentication Center (AuC) from CGMA and GSM technologies, with each serving substantially the same functions for their respective networks.

The policy and charging rules function (PCRF) 110 is a software node that determines policy rules in the network 600. The PCRF 110 is generally operates at the network core and accesses subscriber databases (e.g., the HSS/HLR 622) and other specialized functions, such as content handling (e.g., whether the user has sufficient data left in their plan), in a centralized manner. The PCRF 110 is the main part of the network 600 that aggregates information to and from the network 600 and other sources (e.g., IP networks 610). The PCRF 110 can support the creation of rules and then can automatically make policy decisions for each subscriber active on the network 600. The PCRF 110 can also be integrated with different platforms like billing, rating, charging, and subscriber database or can also be deployed as a standalone entity.

Finally, the 3GPP AAA server 626 performs authentication, authorization, and accounting (AAA) functions and may also act as an AAA proxy server. For WLAN 614 access to (3GPP) IP networks 610 the 3GPP AAA Server 626 provides authorization, policy enforcement, and routing information to various WLAN components. The 3GPP AAA Server 626 can generate and report charging/accounting information, performs offline charging control for the WLAN 614, and perform various protocol conversions when necessary.

While several possible examples are disclosed above, examples of the present disclosure are not so limited. For instance, while the systems and methods above are discussed with reference to use with cellular communications, the systems and methods can be used with other types of wired and wireless communications. In addition, while various functions are discussed as being performed on the server 500 and/or various components on the cellular network 600, other components could perform the same or similar functions without departing from the spirit of the invention.

The specific configurations, connections, and network routing can be varied according to particular design specifications or constraints requiring a UE 122, server 500, or methods 200, 300 constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
sending, from a proxy call session control function (PCSCF) to a policy charging rules function (PCRF), an authorization and addressing request (AAR) associated with a voice over long term evolution (VoLTE) call for a user equipment (UE);
receiving, at the PCSCF from the PCRF, an error code indicating that the PCRF is unable to initiate a first Gx binding;
determining, by the PCSCF and based partly on receiving the error code, information for causing a second Gx binding between the PCRF and a packet gateway (PGW) associated with the UE, the information including a name for the PGW retrieved from a PGW name lookup;
sending, from the PCSCF to the PCRF, a second request associated with the VoLTE call containing the information to cause the PCRF to initiate the second Gx binding with the PGW; and
sending, from the PCRF to the PGW, a session request attribute value pair (AVP) message to cause the PGW to initiate the second Gx binding.

2. The method of claim 1, further comprising:
retrieving, with the PCRF, an internet protocol (IP) address for the PGW associated with the name.

3. The method of claim 1, wherein the PGW name lookup comprises a database including:
a first list of names for a plurality of PGWs; and
a second list of IP addresses for the plurality of PGWs;
wherein each of the plurality of PGWs is associated with at least one name selected from the first list and at least one IP address selected from the second list.

4. The method of claim 1, wherein the PGW name lookup comprises a database including:
a first list of IP ranges for a plurality of UEs; and
a second list of names for a plurality of PGWs;
wherein each of the PGWs is associated with at least one IP range selected from the first list and at least one name selected from the second list.

5. The method of claim 1, further comprising:
retrieving, with the PCSCF, an IP address for the PGW associated with the name; and
sending, from the PCSCF to the PCRF, an attribute value pair (AVP) message including the IP address.

6. The method of claim 1, further comprising:
receiving, at the PCSCF and from the PCRF, an indication that the PCRF failed to initiate the second Gx binding; and
sending, from the PCSCF to the PGW, instructions to cause the PGW to establish a Gx session with the PCRF.

7. A method comprising:
sending, from a proxy call session control function (PCSCF) to a policy charging rules function (PCRF), an authorization and addressing request (AAR) associated with a voice over long term evolution (VoLTE) call for a user equipment (UE);
receiving, at the PCSCF from the PCRF, an error code indicating that a first Gx binding is unavailable;
retrieving, with the PCSCF, a name of a packet gateway (PGW) associated with the UE from a PGW name lookup;
retrieving, with the PCSCF, an internet protocol (IP) address associated with the name of the PGW from a PGW IP lookup;
sending, from the PCSCF to the PCRF, an attribute value pair (AVP) message including the IP address of the PGW associated with the UE and causing the PCRF to initiate a second Gx binding;
receiving, at the PCSCF and from the PCRF, an indication that the PCRF failed to initiate the second Gx binding;
sending, from the PCSCF to the PGW, instructions to cause the PGW to establish a Gx session with the PCRF; and
sending, from the PCSCF to the PGW, a session request AVP message to cause the PGW to initiate the second Gx binding.

8. The method of claim 7, wherein the PGW IP lookup comprises a database including:
a first list of names for a plurality of PGWs; and
a second list of IP addresses for the plurality of PGWs;
wherein each of the plurality of PGWs is associated with at least one name selected from the first list and at least one IP address selected from the second list.

9. The method of claim 7, wherein the PGW name lookup comprises a database including:
a first list of IP ranges for a plurality of UEs; and
a second list of names for a plurality of PGWs;
wherein each of the plurality of PGWs is associated with at least one IP range selected from the first list and at least one name selected from the second list.

10. The method of claim 7, wherein the error code comprises a 5065—IP-CAN_SESSION_NOT_AVAILABLE error code.

11. A system comprising:
a proxy call session control function (PCSCF) comprising:
one or more transceivers;
memory storing at least a Gx backup algorithm and a packet gateway (PGW) name lookup; and
one or more processors in communication with the one or more transceivers and the memory, the Gx backup algorithm causing the PCSCF to:
send, with the one or more transceivers, an authorization and addressing request (AAR) to a policy charging rules function (PCRF) to establish a voice over long term evolution (VoLTE) call for a user equipment (UE);
receive, with the one or more transceivers, an error message from the PCRF indicating that a first Gx binding is unavailable;
determine, with the one or more processors and in response to the error message, information to initiate second Gx binding, the information including at least one of a PGW name from the PGW name lookup or a PGW Internet protocol (IP) address;
send, with the one or more transceivers to the PCRF, the information to initiate the second Gx binding between the PCRF and a PGW associated with the UE; and
send, from the PCRF to the PGW, a session request attribute value pair (AVP) message to cause the PGW to initiate the second Gx binding.

12. The system of claim 11, the Gx backup algorithm further causing the PCSCF to:
send, with the one or more transceivers, the information as an attribute value pair (AVP) message to the PCRF.

13. The system of claim 11, further comprising:
a policy charging rules function (PCRF) comprising:
one or more PCRF transceivers;
additional memory storing at least a PGW IP lookup; and
one or more PCRF processors in communication with at least the one or more PCRF transceivers and the additional memory, the additional memory including instructions to cause the PCRF to:
receive, with the one or more PCRF transceivers, an AVP message including the PGW name associated with the UE from the PCSCF; and
retrieve, with the one or more PCRF processors, an IP address associated with the PGW name.

14. The system of claim 11, the memory further storing a PGW IP lookup; and
wherein the Gx backup algorithm further causes the PCSCF to:
retrieve, with the one or more processors, the PGW IP address associated with the PGW name from the PGW IP lookup.

15. The system of claim 14, wherein the PGW IP lookup comprises a database including:
a first list of names for a plurality of PGWs; and
a second list of IP addresses for the plurality of PGWs;
wherein each of the plurality of PGWs is associated with at least one name selected from the first list and at least one IP address selected from the second list.

16. The system of claim 11, wherein the Gx backup algorithm further causes the PCSCF to:

receive, with the one or more transceivers, an indication that the PCRF failed to initiate the second Gx binding; and send, with the one or more transceivers, instructions to cause the PGW to establish a Gx session with the PCRF.

17. The system of claim 11, wherein the PGW name lookup comprises a database including:
   a first list of IP ranges for a plurality of UEs; and
   a second list of names for a plurality of PGWs;
   wherein each of the plurality of PGWs is associated with at least one IP range selected from the first list and at least one name selected from the second list.

* * * * *